United States Patent [19]
Sato

[11] 4,006,352
[45] Feb. 1, 1977

[54] EQUALIZER COMPRISING FIRST AND SECOND EQUALIZING MEANS AND TRAINABLE IN TWO STEPS

[75] Inventor: Yoichi Sato, Tokyo, Japan

[73] Assignee: Nippon Electric Company, Ltd., Tokyo, Japan

[22] Filed: Oct. 17, 1975

[21] Appl. No.: 623,221

[30] Foreign Application Priority Data

Oct. 18, 1974 Japan .............................. 49-119402

[52] U.S. Cl. ................................ 235/152; 325/41; 333/18

[51] Int. Cl.[2] ................. H03K 5/153; G06G 7/625

[58] Field of Search ............ 235/152, 156; 325/41; 333/18

[56] References Cited
UNITED STATES PATENTS 3,659,229  4/1972  Milton ................................. 333/18

Primary Examiner—R. Stephen Dildine, Jr.
Attorney, Agent, or Firm—Sughrue, Rothwell, Mion, Zinn & Macpeak

[57] ABSTRACT

An equalizer comprises a tapped delay line of a transversal filter and first equalizing means responsive to a short pseudo-noise train supplied thereto for adjusting tap gains so as to make the transversal filter output signals simulate a pseudo-noise train generated at the receiver with the pulse pattern of the supplied pseudo-noise train. Larger ones, in absolute values, of the adjusted gains are placed at the center of the delay line. Responsive to a subsequently supplied long pseudo-noise train, second equalizing means self-adaptively adjusts all tap gains. The delay line preferably comprises delay units, each for a half of a common clock interval of the supplied pseudo-noise trains and data signals.

15 Claims, 5 Drawing Figures

EQUALIZER COMPRISING FIRST AND SECOND EQUALIZING MEANS AND TRAINABLE IN TWO STEPS

BACKGROUND OF THE INVENTION

This invention relates to a trainable equalizer.

On training an equalizer, it is conventional to transmit test signals from a transmitter prior to transmission of data signals to a receiver where the equalizer is located. For data signals and consequently test signals transmitted at a high speed compared with the frequency band, complicated procedures have been required for the training. For test signals subjected to a serious distortion during transmission, it has been difficult to duly train the equalizer. In order to train the equalizer with seriously distorted test signals, the transmitter may successively produce as the test signals a tone signal of the carrier frequency, a burst signal, and a pseudo-noise series or train of a predetermined pulse pattern a predetermined time after the burst signal. It is indispensable in the receiver to detect the burst signal, to find the end thereof, and to generate the predetermined time thereafter a pseudo-noise train of the predetermined pulse pattern. Furthermore, it has generally been necessary to set up correct timing between the pseudo-noise train generated in the receiver and that transmitted from the transmitter. This has inevitably resulted in a long period of time required to accomplish the training.

SUMMARY OF THE INVENTION

It is therefore an object of the present invention to provide an equalizer trainable with simple procedures in a short time.

It is another object of this invention to provide an equalizer trainable with misjudgment of the results of training substantially avoided and accordingly even with test signals supplied thereto with a serious distortion.

It is still another object of this invention to provide an equalizer trainable without the necessity of setting up correct timing between signals produced at the receiving end for training purposes and signals supplied thereto.

In accordance with this invention, there is provided an equalizer for producing an equalized signal in response to signals produced in a transmitter at a predetermined clock interval and supplied thereto. The supplied signals include a first and a second pseudo-noise train successively produced in the transmitter. The first pseudo-noise train consists of a series of blocks or partial trains, each having a first period and a predetermined pattern of pulses. The second pseudo-noise train has a second period longer than the first period. The equalizer comprises a delay line having a plurality of taps for delaying the supplied signals by a total delay equal to or longer than the first period to produce delayed signals from the respective taps. A series of adjustable gain circuits are connected to the respective taps and retain adjustable gains for giving the adjustable gains to the respective delayed signals to produce amplitude-varied signals. A noise generator produces a generated pseudo-noise train consisting of the predetermined patterns of pulses. Supplied with the generated pesudo-noise train and the amplitude-varied signals produced in response to the first pseudo-noise train by those central ones of the adjustable gain circuits which are connected to consecutive ones of the taps at which the first pseudo-noise train is delayed by a delay equal in total to the first period, first equalizing means adjusts the adjustable gains retained by the central adjustable gain circuits to make a thereby produced first output signal of the first equalizing means simulate the generated pseudo-noise train. Cyclic permutation means subjects the adjusted gains to cyclic permutation in the central adjustable gain circuits to make those of the central adjustable gain circuits which are disposed at a center portion of the series of the central adjustable gain circuits retain larger ones, in absolute values, of the adjusted gains. Supplied with the amplitude-varied signals produced in response to the second pseudo-noise train by all of the adjustable gain circuits, second equalizing means self-adaptively adjusts the adjustable gains retained by all the adjustable gain circuits to make a thereby produced second output signal of the second equalizing means become the equalized signal.

DESCRIPTION OF THE PREFERRED EMBODIMENTS

Figure 1:
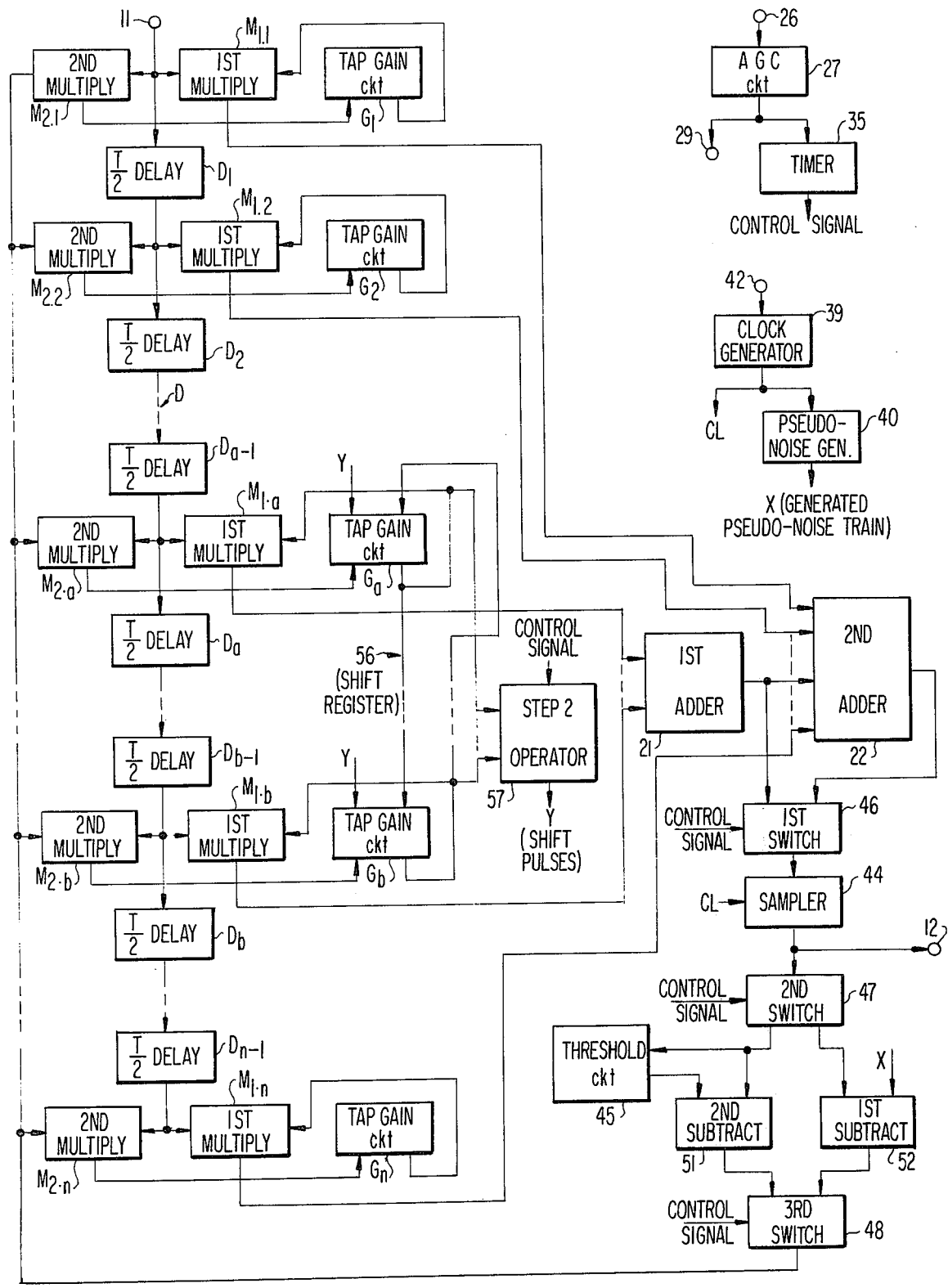
FIG. 1 is a block diagram of an equalizer according to a preferred embodiment of the instant invention and a portion of a receiver including the equalizer.
Figure 2:
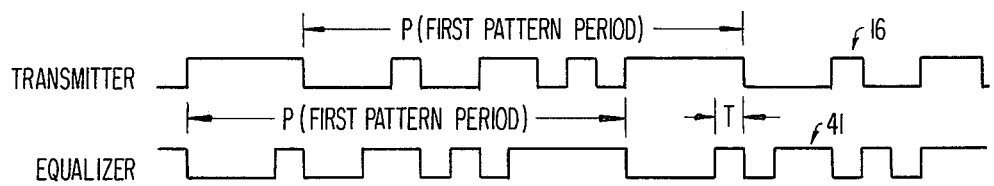
FIG. 2 shows a first pseudo-noise train and a generated pseudo-noise train.
Figure 3:
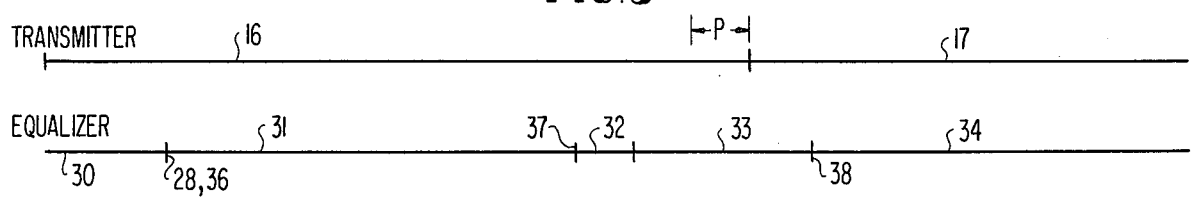
FIG. 3 shows a series of a first and a second pseudo-noise train and another series of steps for training an equalizer according to this invention.

Referring to FIGS. 1 through 3, a trainable equalizer comprises an input terminal 11 supplied with signals to be equalized and an output terminal 12 to which the equalizer supplies an equalized signal after completion of the training. The supplied signals are produced in a transmitter at a predetermined clock interval T depicted in FIG. 2 and include a first and a second pseudo-noise series or train successively produced in the transmitter as best shown in FIG. 3 at 16 and 17. The first pseudo-noise train 16 consists of a series of blocks or partial trains, each having a first period P and a predetermined pattern of pulses exemplified in FIG. 2. The second pseudo-noise train 17 has a second period longer than the first period P. In the example being illustrated, the first pseudo-noise train 16 lasts twelve first periods P. The first period P is fifteen clock intervals T long. The second period is eight or more first periods P long. The first pseudo-noise train 16 may be produced by means (not shown) comprising switches, equal in number to the number of pulses in the first period P, set in compliance with the predetermined pulse pattern. The second pseudo-noise train 17 may be produced by a scrambler (not shown). When use is made of a seven-stage scrambler, it will be understood that the second period is 128 clock intervals T long.

The equalizer comprises a delay line D having a plurality of taps, n in number, including the input terminal 11. The delay line D comprises delay units $D_k$ ($k = 1, 2$ ... $a-1, a, \ldots b-1, b, \ldots$ and $n-1$) between the respective taps. In accordance with a preferred embodiment of the present invention, each of the delay units $D_k$ delays the signals supplied thereto by a delay equal to a half of the clock interval T. Delayed signals $x_k$ (here, $k = 1, 2 \ldots n-1$, and $n$) are produced from the respective taps. It is to be noted that the signals $x_1$ produced at the first tap, namely, at the input terminal 11, are also called "delayed" signals for convenience of description. That portion of the delay line D which comprises the delay units $D_a$ through $D_{b-1}$ provides a total delay of the first period P. In the shown example of the preferred equalizer, the whole delay line D provides a total delay of $(n-1)T/2$ that is longer than the first period P.

The equalizer further comprises a series of adjustable gain circuits comprising, in turn, memory circuits $G_k$ for retaining adjustable gain signals representative of tap or adjustable gains $G_k$ (the same reference letters being used for simplicity of description), first multipliers $M_{1,k}$ connected to the taps and to the memory circuits $G_k$ for giving the adjustable gains $G_k$ to the delayed signals $x_k$ to produce amplitude-varied signals, second multipliers $M_{2,k}$ connected to the taps and responsive to a factor signal later described for multiplying the delayed signals $x_k$ by a factor given by the factor signal to produce product signals, and means for supplying the product signals to the memory circuits $G_k$ to adjust the adjustable gains $G_k$ in the manner described hereunder. Those of the adjustable gain circuits which are connected to the above-mentioned delay line portion, both ends inclusive, are herein named central adjustable gain circuits. The memory circuits $G_a$ through $G_b$, first multipliers $M_{1,a}$ through $M_{1,b}$, and second multipliers $M_{2,a}$ through $M_{2,b}$ of the central adjustable gain circuits are likewise called.

A first adder 21 is connected to the central first multipliers $M_{1,a}$ through $M_{1,b}$ to sum up the amplitude-varied signals produced thereby. It will be understood that the above-mentioned delay line portion, central adjustable gain circuits, and first adder 21 form a first transversal filter for producing a first transversal filter output signal. A second adder 22 is connected to the first adder 21 and to the remaining at least one first multiplier, such as $M_{1,1}, M_{1,2} \ldots$ and $M_{1,a-1}$ (not shown) and $M_{1,b+1}$ (not shown) ... and $M_{1,n}$ to sum up the amplitude-varied signals produced by all of the first multipliers $M_{1,k}$. The whole delay line D, all the adjustable gain circuits, and the second adder 22 form a second transversal filter for producing a second transversal filter output signal.

A receiver including the equalizer comprises a receiver input terminal 26 and an AGC circuit 27. In the manner known in the receiver art, the AGC circuit 27 carries out the so-called CD (carrier detection) to produce a pulse, or a start signal 28 depicted in FIG. 3, confirming reception by the receiver of signals sent from a transmitter and also carries out AGC to the received signals to supply the AGC-ed signals to other parts of the receiver through a terminal 29. The start signal 28 is indicative of substantial beginning of the received signals. By "substantial" beginning, it should be understood that a delay up to about two first periods P shown at 30 in FIG. 3 is allowed. In accordance with this invention, training of the equalizer is accomplished in a series of a first, a second, a third, and a fourth step 31, 32, 33, and 34 illustrated in FIG. 3. In order to define the duration of the first step 31 and the beginning of the fourth step 34, the equalizer comprises a timer 35 for producing control signals in response to the start signal 28. The control signals consist of a first control signal continuing a first predetermined interval from the start signal 28 and a second control signal appearing a second predetermined interval after the start signal 28. The first step 31 should be carried through during presence of the first pseudo-noise train 16. Consequently, the second step 32 begins before the first pseudo-noise train 16 comes to an end. The third step 33 is for insuring the fourth step 34 to begin after the second pseudo-noise train 17 is transmitted from the transmitter. In the example being illustrated, the first predetermined interval is about seven first periods P long. The second predetermined interval is about eleven first periods P long. The first control signal may comprise a first and a second pulse 36 and 37 at the leading and trailing edges thereof. In FIG. 3, the first pulse 36 is depicted in coincidence with the start signal 28 for simplicity of illustration. The second control signal may comprise a third pulse 38 at the leading edge thereof. Incidentally, it will readily be understood by those skilled in the art that the received signals are supplied from the receiver input terminal 26 to the equalizer input terminal 11 normally through a synchronous detector (not shown).

The receiver further comprises a clock generator 39 for producing clock pulses CL at the clock interval T. The equalizer comprises a pseudo-noise signal generator 40 responsive to the clock pulses CL for producing a generated pseudo-noise train X (FIG. 1) or 41 (FIG. 2) consisting of the predetermined patterns of pulses. The pseudo-noise signal generator 40 may be of the same construction as the means in the transmitter for producing the first pseudo-noise train 16. It is quite astonishingly unnecessary with an equalizer according to the preferred embodiment of this invention to establish block synchronism between between the first pseudo-noise train 16 and the generated pseudo-noise train 41 and to maintain bit synchnonism between the clock pulses CL and the clock intervals T of the received signals although the generated pseudo-noise train 41 is depicted in FIG. 2 in bit synchronism with the first pseudo-noise train 16 for convenience of illustration. Therefore, the clock generator 39 may not necessarily be controlled by the received signals. It is, however, desirable in order merely to stabilize the frequency of the produced clock pulses CL to effect the control through a terminal 42 in the manner known in the receiver art. The theory why the block and bit synchronisms are unnecessary is described in a paper published by the present inventor in a Japanese technical periodical, "Tusin-hosiki Kenkyukai Siryo (Papers for Communication System Study Group)" of Densi Tusin Gakkai (The Institute of Electronics and Communication Engineers of Japen), as Paper No. CS 74-23 on May 23, 1974. According to the paper, each of the delay units $D_k$ may provide a delay shorter than the clock interval T. Although a delay of T/2 is most preferred, a delay of 3T/4 is also preferred.

Inasmuch as the signals supplied to the equalizer input terminal 11 are sampled by the delay line D at a half of the clock interval T in accordance with the preferred embodiment of this invention, it is necssary to sample the first or second transversal filter output signal by a sampler 44 at the clock interval T to provide transversal filter output samples. The equalizer comprises first equalizing means for adjusting during the first step 31 the adjustable gains $G_a$ through $G_b$ of the first transversal filter in response to the first pseudo-noise train 16 and with reference to the generated pseudo-noise train 41 so that the first transversal filter output samples may simulate the generated pseudo-noise train 41. The equalizer further comprises second equalizing means for self-adaptively adjusting after the beginning of the fourth step 34 the adjustable gains $G_k$ of the second transversal filter in response to the second pseudo-noise train 17 so that the second transversal filter output samples may become the equalized signal. The equalizer still further comprises a threshold circuit or binary or multilevel signal discrimination circuit 45 known in the art for comparing the transversal filter output samples with at least one threshold level held thereby to produce resulting samples given by results of the comparison.

In order to selectively supply the first and second transversal filter output signals to the sampler 44, the equalizer comprises a first switch 46 between the adders 21 and 22 and the sampler 44. The equalizer further comprises a second and a third switch 47 and 48. The second switch 47 selectively supplies the first transversal filter output samples to a first subtractor 51 and the second transversal filter output samples to a second subtractor 52. The first subtractor 51 produces a first difference signal representative of a first difference between one each of the first transversal filter output samples and the pulses of the generated pseudo-noise train 41. The second subtractor 52 produces a second difference signal representative of a second difference between one each of the second transversal filter output samples and the resulting samples. The third switch 48 selectively supplies the first difference signal to the second multipliers $M_{2,a}$ through $M_{2,b}$ of the first transversal filter and the second difference signal to the second multipliers $M_{2,k}$ of the second transversal filter as the factor signal mentioned hereinabove. The factor mentioned above is given by the first difference during the first step 31 and by the second difference after the beginning of the fourth step 34. The connections formed by the switches 46 through 48 may be called first and second switch means. Responsive to the first pulse 36, the first switch means puts the first equalizing means into operation. Responsive to the second pulse 37, the first switch means terminates the adjustment by the first equalizing means of the adjustable gains $G_a$ through $G_b$ of the first transversal filter. Responsive to the third pulse 38, the second switch means puts the second equalizing means into operation.

During the first step 31, the adjustable gains $G_a$ through $G_b$ of the first transveral filter may be adjusted in compliance with the conventional means square equalization at the successive instants of the clock pulses CL. The algorithm therefor may be defined by:

$$\begin{bmatrix} G_a^{m+1} \\ G_{a+1}^{m+1} \\ G_{a+2}^{m+1} \\ \cdots \\ G_b^{m+1} \end{bmatrix} = \begin{bmatrix} G_a^m \\ G_{a+1}^m \\ G_{a+2}^m \\ \cdots \\ G_b^m \end{bmatrix} - \alpha \begin{bmatrix} x_{a,t} \\ x_{a+1,t} \\ x_{a+2,t} \\ \cdots \\ x_{b,t} \end{bmatrix} \left( \sum_{i=a}^{b} x_{i,t} \cdot G_i^m - d_t \right),$$

where $m$ represents the number of times of the gain adjustment, $t$ represents the clock pulse instants, $\alpha$ respresents a predetermined small positive constant of the order of $1/(2P)$, and $d$ represents the pulse of the generated pseudo-noise train 41. It will now be appreciated that the means mentioned hereinabove for supplying the product signals during the first step 31 to the memory circuits $G_a$ through $G_b$ to adjust the adjustable gains $G_a$ through $G_b$ comprises means for multiplying the product signals by the constant $\alpha$ and means for subtracting the resulting products from the adjustable gains $G_a^m$ through $G_b^m$ to substitute new adjustable gains $G_a^{m+1}$ through $G_b^{m+1}$ for the previous adjustable gains $G_a^m$ through $G_b^m$. Alternatively, the above-mentioned factor may be given by the first difference multiplied by the constant $\alpha$. At the end of the first step 31, the adjustable gains $G_a$ through $G_b$ converge to adjusted gains that provide considerable equalization to the supplied signals.

Figure 4:
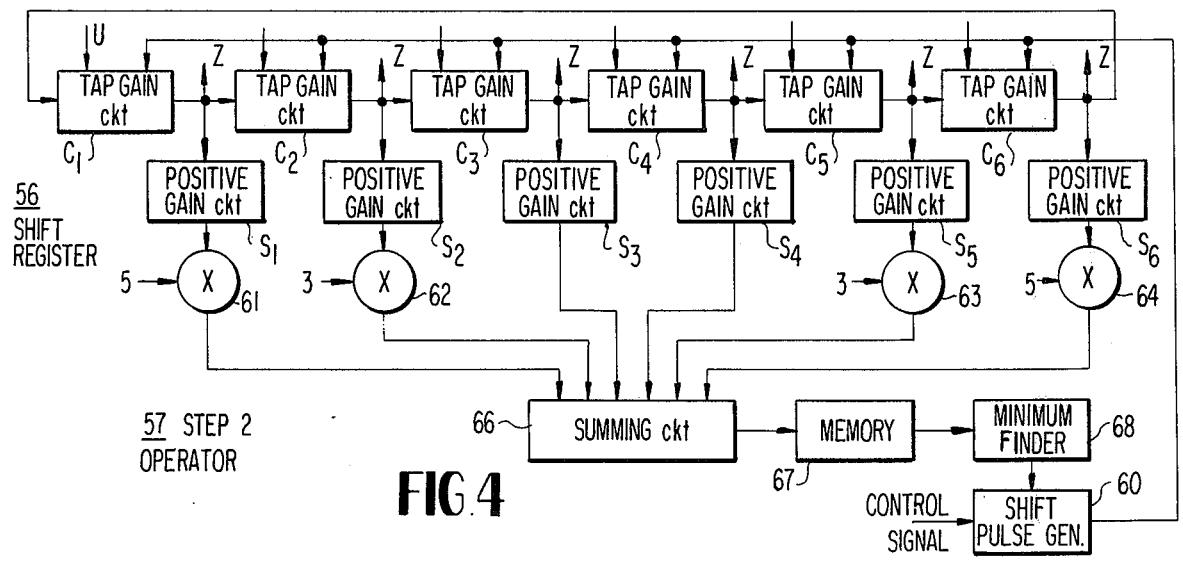
FIG. 4 is a block diagram of cyclic permutation means used in a simplified equalizer according to this invention.
Figure 5:
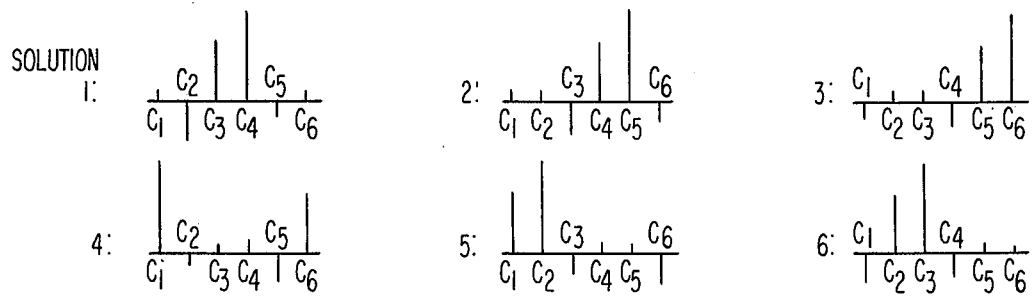
FIG. 5 shows several solutions obtainable by a first step illustrated in FIG. 3 with the simplified equalizer of which the cyclic permutation means is depicted in FIG. 4.

Referring now to FIGS. 4 and 5, only six memory circuits $C_1$ through $C_6$ of the adjustable gain circuits for retaining adjustable gains $C_1$ through $C_6$ (the same reference letters being again used) are shown as the central memory circuits for simplicity of description. Due to the block asynchronism between the first and generated pseudo-noise trains 16 and 41, the memory circuits $C_1$ through $C_6$ retain the adjusted gains $C_1$ through $C_6$ in one of the manners exemplified in FIG. 5 as Solutions 1 through 6. On the other hand, it is known from the theory of equalizers for aperiodic data signals that larger ones, in absolute values, of the adjusted gains $C_1$ through $C_6$ should be retained, as in Solution 1 or 6, by those of the memory circuits $C_1$ through $C_6$ which are located at a center portion of the series of the adjustable gain circuits. In accordance with this invention, the adjusted gains $C_1$ through $C_6$ are therefore subjected to cyclic permutation in the memory circuits $C_1$ through $C_6$ during the second step 32. In other words, an equalizer according to this invention comprises cyclic permutation means for carrying out the cyclic permutation.

Referring to FIG. 4 in detail, the cyclic permutation means comprises a shift register 56 and a "step 2" operator 57 (both being depicted also in FIG. 1). The shift register 56 comprises as its stages the memory circuits $C_1$ through $C_6$ (in FIG. 1, $G_a$ through $G_b$) of the central adjustable gain circuits. The operator 57 comprises a shift pulse generator 60 responsive to the second pulse 37 for supplying a predetermined number of shift pulses Y (FIG. 1) during a first half of the second step 32 to the shift register 56 so as to simultaneously shift at each instant of shift, namely, at the time of each shift pulse, the adjusted gains or, more correctly, the adjusted gain signals, to cyclically successive shift register stages. The shift pulses may have any repetition frequency. The predetermined number is equal to the number of the shift register stages. Means $S_1$ through $S_6$ are provided for deriving positive gains related to the respective adjusted gains, such as squares of the adjusted gains $G_a^2$ through $G_b^2$ or absolute values of the adjusted gains $|G_a|$ through $|G_b|$, in response to the respective adjusted gain signals to produce positive gain signals representative of the positive gains. Weights, such as five and three, are predetermined for the shift register stages so as to grow larger as the shift register stages depart from the center portion towards both ends of the shift register stages. Means for retaining the weights, except the weights of unity, are illustrated by arrows having the weights as the lengends. Product circuits 61, 62, 63, and 64 are connected to the positive gain deriving means $S_1$, $S_2$, $S_5$, and $S_6$ for the shift register stages except those situated at the center portion $C_3$ and $C_4$ and to the weight retaining means to derive products of the weights and the positive gains derived for each instant of shift and to produce weighed signals representative of the products. A summing circuit 66 is connected to the gain deriving means $S_3$ and $S_4$ for the center portion shift register stages $C_3$ and $C_4$ and to the product circuits 61 through 64 to sum up the weighed signals and to produce at each instant of shift a weighed sum signal representative of a weighed sum of the positive gains. A memory 67 is provided for memorizing the weighed sum signals produced for the predetermined number of the shift pulses and also memorizing ordinal number signals representative of ordinal numbers of the shift pulses, namely, the instants of shift, for which the respective weighed sums are successively calculated by the summing circuit 66.

In a second half of the second step 32, a minimum finder 68 compares the weighed sum signals memorized in the memory 67 to find a minimum of the weighed sums. Responsive also to the ordinal number signals, the minimum finder 68 detects a specific instant of shift for which the particular weighed sum signal repesentative of the minimum weighed sum is produced to produce a result or specific instant signal indicative of the specific instant. Responsive to the result signal, the shift pulse generator 60 further produces additional shift pulses of a number dependent on the ordinal number of the shift pulse for the specific instant to make the center portion shift register stages $C_3$ and $C_4$ retain the adjusted gain signals representative of the larger adjusted gains. At this instant, the second step 32 autonomously comes to an end into the third step 33. Incidentally, the memory circuits $C_1$ through $C_6$ supply the adjustable or adjusted gain signals to the central first multipliers $M_{1.a}$ through $M_{1.b}$ (FIG. 1) as symbolized at Z and receive the product signals from the central second multipliers $M_{2.a}$ through $M_{2.b}$ through the above-mentioned means U.

As described in the preamble of the instant specification, the delay provided by the delay line D may be equal to the first period P. In this event, it is possible to simplify the circuitry of an equalizer according to the preferred embodiment by substituting a single adder 21 or 22 for the two adders 21 and 22 and by omitting the first switch 46. The transversal filter output samples serve as a first output signal of the first equalizing means during the first and second steps 31 and 32 and serve as a second output signal of the second equalizing means after the beginning of the fourth step 34.

While the invention has been thus described in conjunction with specific embodiments thereof, it will be understood that an equalizer according to this invention is trainable primarily in two steps or procedures, namely, in the first step 31 by the first equalizing means and in the fourth step 34 by the second equalizing means. The first period P may be from fifteen to twenty clock intervals T long. Inasmuch as it is desirable to complete the training in a shortest possible period of time, it is preferred to produce in the transmitter the first pseudo-noise train 16 immediately followed by the second pseudo-noise train 17 although a short interval may be left therebetween. It is also preferred that the duration of the first pseudo-noise train 16 be about 250 milliseconds and that that of the first step 31 be about 150 milliseconds. It is possible to accomplish the second step 32 in about one first period P. Under the circumstances, the second predetermined interval for the third pulse 38 may be about 230 milliseconds long. The data signals may be either binary or multilevel signals of a predetermined clock or bit interval T, which provides time slots in multiplexed communication. When the data signals are of multilevel pulses, it is preferable to use a pulse train of the same number of levels as the second pseudo-noise train 17 while the first pseudo-noise train 16 may be whichever of a binary pulse train and a pulse train of the same or a different number of levels.

What is claimed is:

1. An equalizer, supplied with signals produced in a transmitter at a predetermined clock interval, for producing an equalized signal, said supplied signals including a first and a second pseudo-noise train successively produced in said transmitter, said first pseudo-noise train consisting of a series of partial trains, each of said partial trains having a first period and a predetermined pattern of pulses, said second pseudo-noise train having a second period longer than said first period, which comprises:

a delay line having a plurality of taps for delaying said supplied signals by a total equal at least to said first period to produce delayed signals from the respective taps;

a series of adjustable gain circuits connected to the respective taps and retaining adjustable gains for giving the adjustable gains to said delayed signals, respectively, to produce amplitude-varied signals;

a noise generator for producing a generated pseudo-noise train consisting of said predetermined patterns of pulses;

first equalizing means, supplied with said generated pseudo-noise train and the amplitude-varied signals produced in response to said first pseudo-noise train by those central ones of said adjustable gain circuits which are connected to consecutive ones of said taps at which said first pseudo-noise train is delayed by a delay equal in total to said first period, for adjusting the adjustable gains retained by said central adjustable gain circuits to make a thereby produced first output signal of said first equalizing means simulate said generated pseudo-noise train;

cyclic permutation means for subjecting said adjusted gains to cyclic permutation in said central adjustable gain circuits to make those of said central adjustable gain circuits which are placed at a center portion of the series of said central adjustable gain circuits retain larger ones, in absolute values, of said adjusted gains; and second equalizing means supplied with the amplitude-varied signals produced in response to said second pseudo-noise train by all of said adjustable gain cicuits for self-adaptively adjusting the adjustable gains retained by said all adjustable gain circuits to make a thereby produced second output signal of said second equalizing means become said equalized signal.

2. An equalizer as claimed in claim 1, wherein said delay line comprises delay units between the respective taps, each of said delay units delaying pertinent one of said supplied signal and the delayed signals produced by the next preceding delay unit by a delay equal to a half of said clock interval.

3. An equalizer as claimed in claim 2, said all adjustable gain circuits comprising memory circuits for retaining adjustable gain signals representative of the adjustable gains and first multipliers connected to the respective taps and to the respective memory circuits for producing said amplitude-varied signals, wherein said cyclic permutation means comprises:
- a shift register comprising as its stages the memory circuits of said central adjustable gain circuits;
- means for shifting, simultaneously at each instant of shift, adjusted gain signals representative of said adjusted gains to cyclically successive shift register stages;
- means responsive to said adjusted gain signals for deriving positive gains related to said adjusted gains, respectively, to produce positive gain signals representative of said positive gains;
- means responsive to said positive gain signals for calculating a weighed sum of said positive gains for each instant of shift to produce a weighed sum signal respresentative of said weighed sum;
- means, by comparing the weighed sum signals produced for a plurality of instants of shift, for finding a minimum of the weighed sums to produce a result signal indicative of a specifc instant of shift for which the minimum weighed sum is calculated by said calculating means; and
- means responsive to said result signal for making said shifting means further shift said adjusted gain signals in said shift register stages to make the shift register stages disposed at said center portion retain the adjusted gain signals representative of said larger adjusted gains.

4. An equalizer as claimed in claim 3, wherein said calculating means comprises:
- means for retaining weights for the respective shift register stages except the shift register stages disposed at said center portion, said weights being so predetermined that the weights grow larger as the shift register stages depart from said center portion towards both ends of said shift register stages;
- product circuits connected to the shift register stages through the positive gain deriving means and to said weight retaining means for deriving products of said positive gains and said weights for each instant of shift to produce weighed signals representative of said products; and
- a summing circuit connected to said product circuits and to the positive gain deriving means for the shift register stages of said center portion for deriving said weighed sum signal.

5. An equalizer as claimed in claim 4, wherein said positive gain deriving means comprises squaring circuits connected to the respective shift register stages for deriving squares of the respective adjusted gains as said positive gains to supply said positive gain signals to said product circuits and to said summing circuit.

6. An equalizer as claimed in claim 4, wherein said positive gain deriving means comprises absolute value circuits connected to the respective shift register stages for deriving absolute values of the respective adjusted gains as said positive gains to supply said positive gain signals to said product circuits and to said summing circuit.

7. An equalizer as claimed in claim 3, wherein said minimum finding means comprises:
- means for memorizing said weighed sum signals and ordinal number signals respesentative of ordinal numbers of the instants of shift for which the respective weighed sums are calculated by said calculating means; and
- means responsive to said weighed sum and ordinal number signals memorized in said memorizing means for comparing said weighed sums to find said minimum and to produce; said result signal.

8. An equalizer as claimed in claim 3 and included in a receiver for said supplied signals, said receiver including means responsive to said supplied signals for producing a start signal indicative of substantial beginning of said supplied signals, said equalizer further comprising:
- a timer responsive to said start signal for producing a first control signal continuing a first predetermined interval following said start signal and a second control signal a second predetermined interval after said start signal;
- first switch means responsive to said first control signal for making said first equalizing means adjust the variable gains of said central adjustable gain circuits during said first predetermined interval;
- means responsive to said first control signal for setting said shifting means into operation upon termination of said first predetermined interval; and
- second switch means responsive to said second control signal for setting said second equalizing means into operation after a lapse of said second predetermined interval.

9. An equalizer as claimed in claim 8, wherein said first period is from 15 to 20 clock intervals long, said first pseudo-noise train lasts about 250 milliseconds, said second period is from 100 to 200 clock intervals long, said first predetermined interval is about 150 milliseconds long, and said second predetermined interval is about 230 milliseconds long.

10. An equalizer as claimed in claim 8, wherein said delay line delays said supplied signals by a total delay equal to said first period.

11. An equalizer as claimed in claim 10, said adjustable gain circuits further comprising second multipliers responsive to said delayed signals and a factor signal representative of a factor for producing product signals given by the respective delayed signals multiplied by said factor and means for supplying said product signals to the respective memory circuits to adjust the adjustable gains, said equalizer further comprising a sampler for sampling a sampler input signal at said clock interval to produce sampler output signals, wherein said first equalizing means comprises:
- an adder connected to said first multipliers for summing up the amplitude-varied signals to produce a transversal filter output signal;
- means for supplying said transversal filter output signal to said sampler as said sampler input signal to make said sampler produce transversal filter output samples as said sampler output signals;
- a first subtractor responsive to said transversal filter output samples and to said generated pseudo-noise train for producing a first difference signal representative of a first difference between one each of said transversal filter output samples and said generated pseudo-noise train pulses; and
- means for supplying said first difference signal as said factor signal to said second multipliers through said first switch means, said transversal filter output samples thereby serving as said first output signal, said factor thereby being given hy the first difference between one each of said generated pseudo-noise train pulses and the transversal filter output samples produced in response to said first pseudo-noise train.

12. An equalizer as claimed in claim 11, wherein said second equalizing means comprises:
a threshold circuit, by comparing said transversal filter output samples with at least one threshold level, for producing resulting samples given by results of the comparison;
a second subtractor responsive to said transversal filter output samples and to said resulting samples for producing a second difference signal representative of a second difference between one each of said transversal filter output samples and said resulting samples; and
means for supplying said second difference signal to said second multipliers through said second switch means as said factor signal, said transversal filter output samples thereby serving as said second output signal, said factor thereby being given by the second difference between one each of said resulting samples and the transversal filter output samples produced in response to said second pseudo-noise train.

13. An equalizer as claimed in claim 8, wherein said delay line delays said supplied signals by a total delay longer than said first period.

14. An equalizer as claimed in claim 13, said adjustable gain circuits further comprising second multipliers responsive to said delayed signals and a factor signal representative of a factor for producing product signals given by the respective delayed signals multiplied by said factor and means for supplying said product signals to the respective memory circuits to adjust the adjustable gains, said equalizer further comprising a sampler for sampling a sampler input signal at said clock interval to produce sampler output signals, wherein said first equalizing means comprises:
a first adder connected to those central ones of said first multipliers which are included in said central adjustable gain circuits for summing up the amplitude-varied signals produced by said central first multipliers to produce a first transversal filter output signal;
means for supplying said first transversal filter output signal to said sampler through said first switch means as said sampler input signal to make said sampler produce first transversal filter output samples as said sampler output signals, said first transversal filter output samples thereby serving as said first output signal;
a first subtractor responsive to said first transversal filter output samples and to said generated pseudo-noise train for producing a first difference signal representative of a first difference between one each of said first transversal filter output samples and said generated pseudo-noise train pulses; and
means for supplying said first difference signal to said second multipliers through said first switch means as said factor signal, said factor thereby being given by the first difference between one each of said generated pseudo-noise train pulses and the first transversal filter output samples produced in response to said first pseudo-noise train.

15. An equalizer as claimed in claim 14, wherein said second equalizing means comprises:
a second adder connected to said first adder and to at least one of said first multipliers that is included in the adjustable gain circuits except said central adjustable gain circuits for summing up the amplitude-varied signals produced by all of said first multipliers to produce a second transversal filter output signal;
means for supplying said second transversal filter output signal to said sampler through said second switch means as said sampler input signal to make said sampler produce second transversal filter output samples as said sampler output signals, said second transversal filter output samples thereby serving as said second output signal;
a threshold circuit, by comparing said second transversal filter output samples with at least one threshold level, for producing resulting samples given by results of the comparison;
a second subtractor responsive to said second transversal filter output samples and to said resulting samples for producing a second difference signal representative of a second difference between one each of said second transversal filter output samples and said resulting samples; and
means for supplying said second difference signal to said second multipliers through said second switch means as said factor signal, said factor thereby being given by the second difference between one each of said resulting samples and the second transversal filter output samples produced in response to said second pseudo-noise train.

* * * * *

UNITED STATES PATENT AND TRADEMARK OFFICE
CERTIFICATE OF CORRECTION

PATENT NO. : 4,006,352
DATED : February 1, 1977
INVENTOR(S) : Yoichi SATO

It is certified that error appears in the above-identified patent and that said Letters Patent are hereby corrected as shown below:

IN THE SPECIFICATION

Column 3, line 6 - after "..." insert --,--
Column 4, line 56 - delete "Japen" and insert --Japan--
Column 6, line 62 - delete "regester" and insert -- register --
line 66 - delete "lengends" and insert --legends--
Column 7, line 52 - after "While" delete "the" and insert -- this --

IN THE CLAIMS

Column 8, line 24 - after "total" insert -- delay --
Column 10, line 4 - after "produce" delete ";"

Signed and Sealed this

Thirty-first Day of May 1977

[SEAL]

Attest:

RUTH C. MASON
Attesting Officer

C. MARSHALL DANN
Commissioner of Patents and Trademarks